United States Patent [19]

Lanser

[11] Patent Number: 6,099,291
[45] Date of Patent: Aug. 8, 2000

[54] HEAT STAKING APPARATUS WITH RADIANT HEAT SOURCE

[75] Inventor: Mark W. Lanser, Cadillac, Mich.

[73] Assignee: Extol, Inc., Zeeland, Mich.

[21] Appl. No.: 09/222,119

[22] Filed: Dec. 29, 1998

[51] Int. Cl.$^7$ ................................................ B29C 65/14
[52] U.S. Cl. ...................... 425/508; 264/481; 264/492; 264/249; 156/423; 29/243.5; 29/509
[58] Field of Search ................................. 264/445, 481, 264/492, 248, 249; 156/423, 580, 583.1; 425/508; 29/243.5, 509

[56] References Cited

U.S. PATENT DOCUMENTS

| | | | |
|---|---|---|---|
| 3,367,809 | 2/1968 | Soloff | 156/73.1 |
| 3,499,808 | 3/1970 | Obeda | 264/249 |
| 4,385,344 | 5/1983 | Gonser | 362/32 |
| 4,504,298 | 3/1985 | Yokota et al. | 65/388 |
| 4,534,811 | 8/1985 | Ainslie et al. | 156/272.8 |
| 4,633,559 | 1/1987 | Loren | 29/243.5 |
| 4,636,609 | 1/1987 | Nakamata | 219/121.75 |
| 4,676,586 | 6/1987 | Jones et al. | 350/96.2 |
| 4,767,298 | 8/1988 | Bocchicchio et al. | 425/112 |
| 4,859,378 | 8/1989 | Wolcott | 264/445 |
| 5,018,957 | 5/1991 | Assink et al. | 425/112 |
| 5,227,173 | 7/1993 | Sherwood | 425/143 |
| 5,250,235 | 10/1993 | Cook et al. | 264/1.37 |
| 5,368,802 | 11/1994 | Wanha | 264/249 |
| 5,423,938 | 6/1995 | Hofius, Sr. et al. | 156/497 |
| 5,538,680 | 7/1996 | Enders | 264/516 |
| 5,871,784 | 2/1999 | Assink et al. | 425/383 |

*Primary Examiner*—Jan H. Silbaugh
*Assistant Examiner*—Stefan Staicovici
*Attorney, Agent, or Firm*—Young & Basile, P.C.

[57] ABSTRACT

A machine for heat staking utilizes an infrared heat lamp to direct radiant energy onto a plastic stud to heat and soften the plastic material prior to the staking punch impacting the stud. In a first embodiment of the invention, the lamp is mounted directly above and in coaxial alignment with the staking punch such that the lamp points downward toward the plastic stud. An annular reflector is positioned in a radially surrounding relationship to the stud such that all of the radiant energy emitted by the lamp strikes the reflector and is redirected radially inward onto the stud. In an alternate embodiment of the invention, an infrared lamp is mounted on a non-moving portion of the staking press machinery and one or more fiber-optic cables extend from the lamp to the vicinity of the stud. The fiber-optic cables gather substantially all of the radiant energy produced by the lamp and direct it onto the stud.

12 Claims, 2 Drawing Sheets

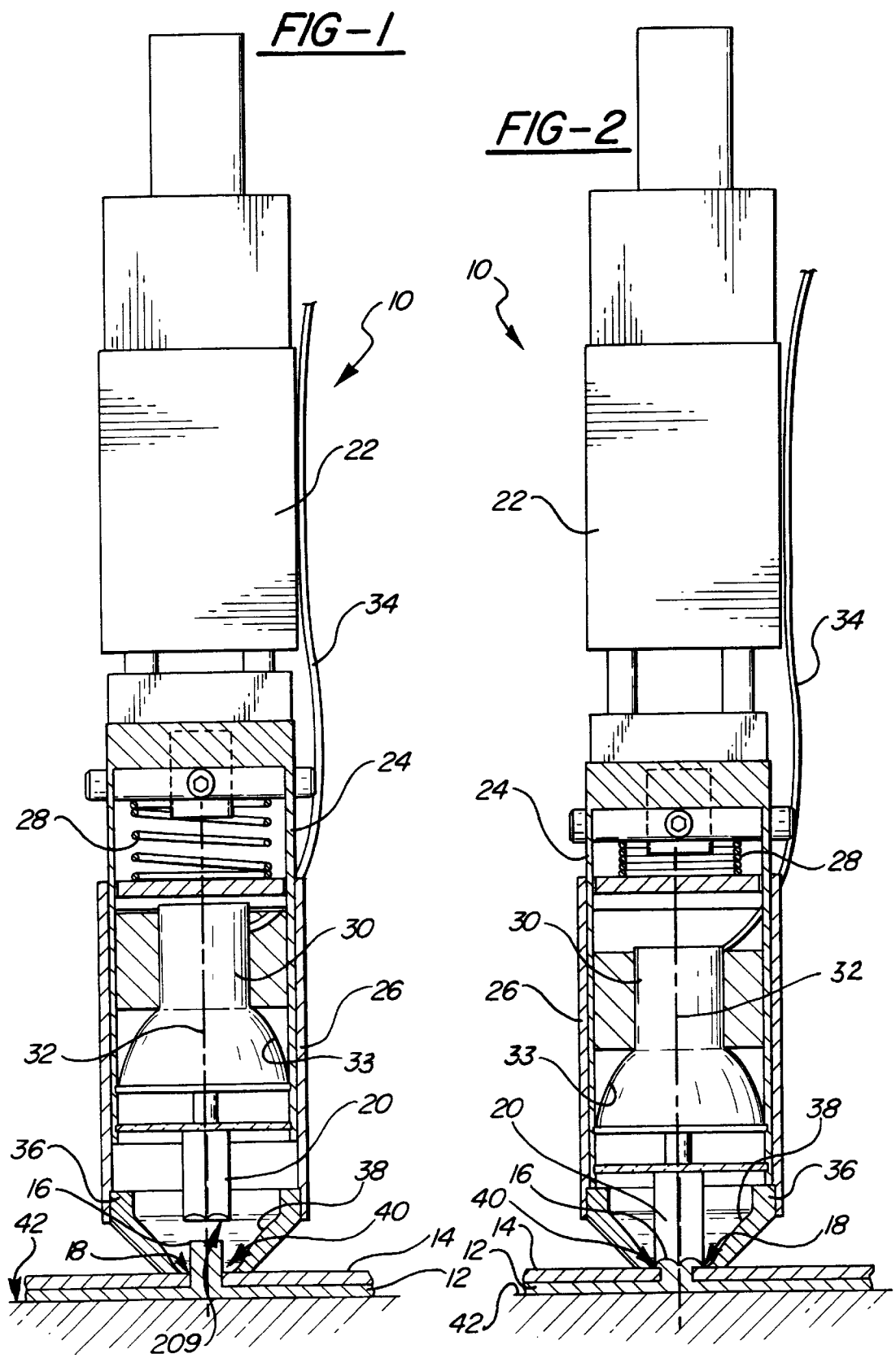

HEAT STAKING APPARATUS WITH RADIANT HEAT SOURCE

FIELD OF THE INVENTION

The present invention relates to heat staking machines for joining parts together, and more particularly to such a machine utilizing a radiant heat source to heat and thereby soften the part to be deformed.

BACKGROUND OF THE INVENTION

Heat staking is a process for permanently joining first and second parts at one or more discrete points. One of the parts to be joined includes a short plastic post or stud which is inserted through a hole or aperture of roughly equivalent size in other part. The plastic stud is then heated until it is plastically deformable and the end of the stud is flattened with a metal punch to form a rivet-like head which locks the two parts together.

It is possible to accomplish the heating and the flattening of the stud simultaneously by heating the punch prior to bringing into contact with the stud, the punch transferring its heat to the stud to soften it is being shaped. In such an operation, the punch is typically resistance heated by applying electrical current to the punch. Heat staking machines operating in this manner are disclosed in U.S. Pat. No. 4,767,298 and U.S. Pat. No. 5,227,173.

Another known heat staking technique is to heat the stud prior to it being contacted by the punch. In the past, this has been achieved by blowing hot air over the stud. U.S. Pat. No. 5,018,957 discloses a staking machine using electric heaters to generate the hot air and blowers to circulate the hot air over the stud. In some manufacturing operations, this pre-impact heating of the stud has been found to be advantageous in that it minimizes the amount of residual stress in the deformed stud after it has cooled. In the past, however, the apparatus necessary for the heating and circulation of air has resulted in a relatively large and mechanically complicated machine. Also, such a machine is relatively energy inefficient in that a large percentage of the heat generated to is not transferred to the stud but rather is wasted.

It is therefore desirable to provide a heat staking machine that is energy efficient and that is simple and compact in construction.

SUMMARY OF THE INVENTION

In accordance with the present invention, an improved heat staking apparatus utilizes a radiant heat source to direct radiant energy onto the plastic stud to heat and so soften it prior to the staking punch impacting the stud. The radiant source need not be located immediately adjacent the stud, but rather may be positioned a short distance away where it does not interfere with other mechanical components of the staking device yet is still able to effectively direct radiant energy onto the stud.

In a first embodiment of the invention, the source of radiant energy is an infrared heat lamp mounted directly above and in coaxial alignment with the staking punch such that the lamp points downward toward the plastic stud. An annular reflector is positioned in radially surrounding relationship to the stud such that substantially all of the radiant energy emitted by the lamp strikes the reflector and is redirected radially inward onto the stud. This provides a compact, mechanically simple and highly energy efficient staking apparatus.

In an alternate embodiment of the invention, an infrared lamp is mounted on a non-moving portion of the staking press machinery of adjacent thereto, and one or more fiber-optic cables extend from the lamp to the vicinity of the stud. The fiber-optic cables gather substantially all of the radiant energy produced by the lamp and direct it onto the stud. The infrared lamp may thus be mounted at almost any location and orientation relative to the stud. In a preferred version of this embodiment, a single cable connects to the lamp and splits into two or more smaller cables as it extends to the stud. The ends of the smaller cables are disposed to surround the stud so as to deliver the radiant energy evenly around the circumference of the stud.

BRIEF DESCRIPTION OF THE DRAWINGS

FIG. 1 is a side elevation view of a staking apparatus according to a first embodiment of the invention with the staking punch in a retracted position;

FIG. 2 is a side elevation view of the heat staking apparatus of FIG. 1 with the staking punch in an extended position.

DESCRIPTION OF THE PREFERRED EMBODIMENTS

Figure 3:
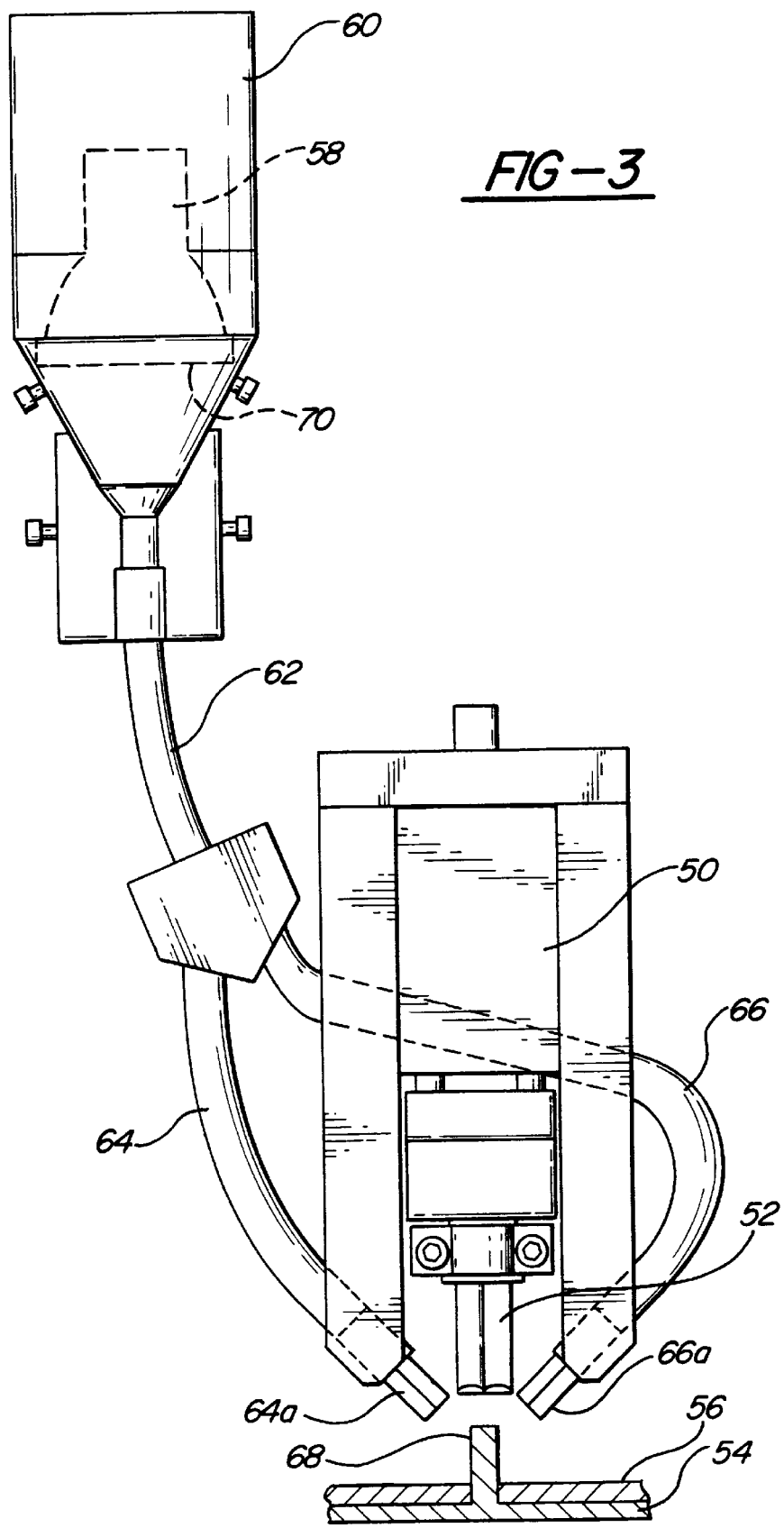
FIG. 3 is a side elevation view of a second embodiment of the invention utilizing fiber-optic cables.

Referring now to FIGS. 1 and 2, a heat staking apparatus 10 according to the present invention is shown positioned above first and a second workpieces 12, 14 which are to be joined. As is well known in the art, a stud 16 formed of a thermoplastic material, such as ABS plastic, projects upwardly from the first workpiece 12 and passes through a hole 18 formed in the second workpiece 14. A staking tool or punch 20 is driven downwardly by an air cylinder 22 to strike and deform the stud 16 which has been heated in a manner to be described below.

The staking apparatus 10 comprises a carriage 24 which is connected to the air cylinder 22 for reciprocal vertical movement relative to the workpieces 12, 14, and a lower frame 26 which remains stationary relative to the workpieces during the staking operation. The carriage 24 slides upwardly and downwardly within the lower frame 26 to ensure proper alignment between the two components at all times. A coil spring 28 is located between the upper surface of the frame 26 and the carriage 24. The staking punch 20 is metal, preferably having a reflective surface finish, and is mounted to the lower end of the carriage 24.

An infrared lamp 30 is mounted to the carriage 24 immediately above the staking punch 20 and is oriented so as to direct its output downward along the axis of movement 32 of the carriage 24. The lamp 30 is essentially conventional in construction, having a parabolic reflector 33 designed to direct the lamp's output parallel to the reflector's axis of symmetry. It has been found that a size MR-11 lamp 30 (approximately 1.375 inches in diameter) operating at 12 volts and 35 watts and having a gold plated reflector generates sufficient heat to soften ABS plastic. The lamp 30 is supplied with electric power by a cord 34 extending upwardly past the air cylinder 22.

A secondary reflector 36 (shown in cut-away in FIGS. 1 and 2) is fixed to the lower end of the frame 26. The reflector 36 is circular when viewed from above, and has a concave inner surface 38 oriented to face upwardly toward the lamp 30. A central aperture 40 adjacent the lower end of the reflector 36 is sized to allow the stud 16 to protrude upwardly therethrough as seen in FIG. 1.

The concave inner surface 38 of the reflector 36 is highly reflective of the wavelengths of infrared radiation emitted by the lamp 30. It has been found that a polished aluminum or stainless steel surface has desirable reflective properties. The surface of the reflector 36 is shaped to reflect the incident radiation from the lamp 30 radially inward, focussing the radiation onto the plastic stud 16 around its entire circumference. The reflector 36 may be machined from a billet of aluminum or stainless steel, with the complex shape of the inner surface 38 being formed by a computer numerically controlled milling machine.

In operation, a staking cycle begins with the first and second workpieces 12, 14 positioned on a firm, flat surface 42 such that the plastic stud 16 projects upwardly through the hole 18 in the second workpiece 14 and through the central aperture 40 of the reflector 36. The infrared lamp 30 is energized and the radiation emitted thereby is directed downwardly, strikes the inner surface 38 of the reflector 36 and is reflected radially inward onto the stud 16.

The infrared lamp 30 is energized for a length of time sufficient to heat the stud 16 to a temperature at which it is plastically deformable. The required heating time depends upon the power output of the lamp 30 and the type and color of the plastic being heated. Using a 35 watt lamp 30 and white ABS plastic, for example, it has been found that it takes approximately 15 seconds to the heat the stud 16 to 350–400° F., the temperature at which it may easily be formed. Darker colored plastic will heat up more quickly.

Once the stud 16 is sufficiently softened, the lamp 30 is deenergized and the air cylinder 22 is actuated to drive the carriage 24 downwardly, urging the staking punch 20 into contact with the stud 16 and flattening the stud as seen in FIG. 2. The lower end of the staking punch 20 which contacts the stud 16 may have a concave surface 20a to achieve proper shaping of the stud 16 after deformation. The staking punch 20, because it has a shiny surface and only a small area thereof is exposed to the lamp's rays, remains relatively cool. Accordingly, contact between the punch 20 and the stud 16 causes the stud 16 to quickly cool and resolidify so that it retains its deformed shape when the air cylinder 22 is retracted and the carriage 24 returns to its raised position, aided by coil spring 28.

It should be noted that the lamp 30 and reflector 36 are oriented so that nearly all of the output of the lamp strikes the reflector and is concentrated onto the stud 16. Accordingly, there is very little undesirable and wasteful heating of the structure of the staking apparatus or the surface of the first workpiece 12 surrounding the stud 16.

The workpieces 12, 14 are then lowered relative to the staking apparatus 10 (this may be achieved by moving the entire staking apparatus upwardly) to withdraw the stud 16 from the central aperture 40, and another pair of workpieces to be joined are placed in the position shown in FIG. 1. The heat/punch staking cycle is then repeated. Although FIGS. 1 and 2 depict a single staking punch 20, it is well known in the art to construct heat staking machines having an array of punches which are driven simultaneously, sometimes by a single air cylinder, so that multiple heat staked joints may be formed with a single stroke of the machine.

Rather than completely deenergizing the lamp 30 prior to actuation of the air cylinder 22, it has been found advantageous instead to reduce the electrical voltage supplied to the lamp to approximately 5 volts. This keeps the lamp filament somewhat warm between heating cycles so that the lamp can quickly return to the desired operating temperature when full power is reapplied.

Rather than using a conventional infrared lamp which is designed to direct its rays parallel to its central axis, it is possible to use a lamp having a convergent reflector design. This type of lamp directs its rays inwardly toward a focal point, and this allows the secondary reflector to be of smaller outer diameter than the lamp while still capturing all of the lamp's output.

It is also possible to mount the lamp away from the axis 32 of punch movement. If this is done, the lamp must still be pointed to direct its rays at the secondary reflector 36, and the secondary reflector must have an inner reflective surface that is not axially symmetric, but rather which focusses the lamp's rays approaching from the off-axis position onto the stud 16. Such an off-axis placement of the lamp may be desirable in order to construct a staking press to meet certain space constraints.

In an alternate embodiment of the invention shown in FIG. 3, an air cylinder 50 drives a reciprocating staking punch 52 upwardly and downwardly with respect to the first and second workpieces 54, 56, in a manner generally similar to the first embodiment disclosed hereinabove. In this second embodiment, however, a radiant heat source such as an infrared lamp 58 is mounted to some stationary structure 60 adjacent to the air cylinder 50. A fiber-optic cable 62 extends from the infrared lamp 58 and splits into two sub-cables 64, 66 which have distal ends 64a, 66a located near and directed at a stud 68 projecting from the first workpiece 54. The fiber-optic cable 62 is a bundle of hundreds of thin glass or plastic filaments which conduct light by internal refraction, as is well known in the art.

A convergent lens 70 adjacent the face of infrared lamp 58 focuses the radiant energy inwardly such that essentially all of it is directed into the fiber-optic cable 62. The radiant energy travels along the cable 62, is split evenly as it enters the sub-cables 64, 66 and is directed onto the stud 68 as it exits the ends of the sub-cables. The sub-cable ends 64a, 66a are mounted on opposite sides of the stud 68 in order to heat the stud evenly around its circumference. The cable may be divided into more than two sub-cables, with the ends of the sub-cables evenly spaced around the circumference of the stud.

The infrared lamp 58 is activated to heat the stud 68 via the fiber-optic cables 62, 64, 66, and when the stud has reached the necessary temperature the air cylinder 50 is cycled as in the first described embodiment to deform the stud and thus secure the two workpieces 54, 56 together.

The use of a heat lamp in a staking machine according to the present invention provides a heat source with nearly instant on/off control, thereby providing precise temperature control. The radiant heat source heats only the stud, thus achieving an overall efficiency of approximately 80%. Commercially available infrared lamps are relatively inexpensive and have lives on the order of 2000 hours, contributing further to the economic advantage of the the invention over the prior art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A heat staking apparatus for deforming a thermoplastic workpiece comprising:

a surface for supporting the workpiece;

a reciprocating carriage movable along an axis toward the surface;

a punch mounted to the carriage for impacting the workpiece;

a radiant heat source mounted to the carriage for directing heat toward the surface; and a reflector disposed adjacent the surface to reflect radiant energy emitted by the radiant source onto the workpiece, the reflector having a central aperture and being disposed in surrounding relationship to the workpiece and with at least part of the workpiece projecting into the central aperture whereby the reflector reflects the radiant energy radially inward onto the workpiece.

2. The heat staking apparatus according to claim 1 wherein the radiant source is mounted on the carriage to direct the radiant energy along the axis of carriage movement.

3. The heat staking apparatus according to claim 1 wherein the radiant heat source is an infrared lamp.

4. A heat staking apparatus for deforming a thermoplastic workpiece comprising:

a reciprocating punch for impacting the workpiece;

a radiant heat source disposed adjacent a rear end of the punch and directing heat along a direction of punch travel; and a reflector having a central aperture and disposed in surrounding relationship to the workpiece with at least part of the workpiece projecting into the central aperture whereby the reflector reflects the heat radially inward onto the workpiece.

5. The heat staking apparatus according to claim 1 further comprising a frame, the reflector being mounted to the frame.

6. A heat staking apparatus for deforming a thermoplastic workpiece comprising:

a surface for supporting the workpiece;

a reciprocating carriage movable along an axis toward the surface;

a punch mounted to the carriage for impacting the workpiece;

a lamp mounted to the carriage and having a bulb generating radiant energy and a reflector directing a substantial portion of the radiant energy toward the surface; and a secondary reflector disposed adjacent the surface and focusing the directed radiant energy onto the workpiece.

7. The heat staking apparatus according to claim 6 wherein the secondary reflector has a central aperture and is disposed in surrounding relationship to the workpiece with at least part of the workpiece projecting into the central aperture whereby the secondary reflector reflects the radiant energy radially inward onto the workpiece.

8. The heat staking apparatus according to claim 6 wherein the lamp axis is aligned generally coaxially with the axis of carriage movement.

9. The heat staking apparatus according to claim 6 further comprising a frame, the reflector being mounted to the frame.

10. A heat staking apparatus for deforming a thermoplastic workpiece comprising:

a surface for supporting the workpiece;

a reciprocating punch for impacting the workpiece;

a radiant heat source for generating radiant energy;

a first reflector directing a substantial portion of the radiant energy toward the surface; and a secondary reflector disposed adjacent the surface and focusing the radiant energy directed by the first reflector onto the workpiece.

11. The heat staking apparatus according to claim 10 further comprising a carriage movable with respect to the surface, the radiant heat source and the first reflector being mounted to the carriage.

12. The heat staking apparatus according to claim 11 further comprising a frame, the first and second reflectors being mounted to the frame.

* * * * *